United States Patent [19]

Itoh et al.

[11] Patent Number: 5,164,442
[45] Date of Patent: Nov. 17, 1992

[54] RUBBER COMPOSITION

[75] Inventors: Kunio Itoh; Motoo Fukushima; Tsutomu Nakamura, all of Gunma; Hiroyuki Ohata; Harukazu Okuda, both of Fukui, all of Japan

[73] Assignees: Shin-Etsu Chemical Company, Ltd., Tokyo; Nissin Chemical Industry Company, Ltd., Fukui, both of Japan

[21] Appl. No.: 504,364

[22] Filed: Apr. 4, 1990

Related U.S. Application Data

[63] Continuation-in-part of Ser. No. 271,828, Nov. 16, 1988, abandoned.

[30] Foreign Application Priority Data

Nov. 16, 1987 [JP] Japan .................. 62-289091

[51] Int. Cl.$^5$ .................................. C08K 3/36
[52] U.S. Cl. .......................... 524/492; 525/479; 524/847; 524/860; 524/588; 524/551; 524/563; 524/560
[58] Field of Search ............... 525/479; 524/847, 860, 524/492, 588, 551, 563, 560

[56] References Cited

U.S. PATENT DOCUMENTS

| | | | |
|---|---|---|---|
| 2,993,877 | 7/1961 | D'Alelio | 260/45.5 |
| 3,644,566 | 2/1972 | Kinchebe et al. | 524/860 |
| 4,151,156 | 4/1979 | Itoh et al. | 524/847 |
| 4,201,698 | 5/1980 | Itoh et al. | 525/105 |
| 4,376,184 | 3/1983 | Itoh et al. | 525/479 |
| 4,399,267 | 8/1983 | Bosch et al. | 525/479 |
| 4,575,531 | 3/1986 | Hoyt et al. | 524/563 |
| 4,584,342 | 4/1986 | Kondow | 524/860 |
| 4,983,685 | 1/1991 | Aoshima et al. | 525/479 |
| 4,987,180 | 1/1991 | Ohata et al. | 525/479 |

*Primary Examiner*—Melvyn I. Marquis
*Assistant Examiner*—Karen A. Hellender
*Attorney, Agent, or Firm*—Millen, White, Zelano and Branigan

[57] ABSTRACT

The polymeric ingredient of the inventive rubber composition is an acrylic polymer modified with a mercapto-containing organopolysiloxane as prepared by the emulsion polymerization of an acrylic monomer in an aqueous emulsion of the organopolysiloxane. Characteristically, the acrylic monomer is copolymerized with another monomer having an active halogen atom or an epoxy group. By virtue of this unique formulation of the rubbery polymer, the inventive rubber composition prepared by compounding the rubbery polymer with a reinforcing filler and a specified curing or crosslinking agent can be vulcanized to give a vulcanizate having excellent mechanical properties, heat resistance, oil resistance and cold resistance as a combination of the features of silicone rubbers and acrylic rubbers.

5 Claims, No Drawings

RUBBER COMPOSITION

BACKGROUND OF THE INVENTION

This is a continuation-in-part application from a copending U.S. patent application Ser. No. 07/271,828 filed Nov. 16, 1988, now abandoned.

The present invention relates to a novel rubber composition or, more particularly, to a rubber composition based on an organopolysiloxane-modified acrylic polymer capable of giving a vulcanizate having excellent heat resistance, cold resistance, oil resistance and mechanical strengths and useful as a material for sealings, O-rings, gaskets, hoses, insulation of electric wires and cables and so on.

As is well known, organopolysiloxane is a polymer having excellent heat and cold resistance and weatherability along with excellent electrical properties so that so-called silicone rubbers compounded with an organopolysiloxane as the base polymer are widely used in various industrial fields. One of the disadvantageous properties of silicone rubbers in general is the relatively poor resistance thereof against oils and organic solvents to be greatly swollen therein even after full vulcanization because the principal constituent of silicone rubbers is a dimethylpolysiloxane which is soluble, for example, in gasoline and other hydrocarbon solvents. With an object to solve this problem, a silicone rubber composition having decreased swellability in organic solvents has been developed which is compounded with an organopolysiloxane having 3,3,3-trifluoropropyl groups as a part of the organic groups bonded to the silicon atoms. Prevalence of such fluorosilicone rubbers is, however, not so wide due to the outstanding expensiveness thereof as compared with conventional non-fluorine silicone rubbers.

On the other hand, acrylic rubbers have excellent oil and solvent resistance along with considerably high heat resistance so that they are highlighted as a rubbery material used in automobiles and other machines and would be used in large quantities if improvements could be attained in their relatively poor cold resistance and low workability in the milling works of the rubber compound.

Extensive investigations have been directed to obtain a highly heat-resistant and oil-resistant rubber by combining a silicone rubber and an acrylic rubber. For example, a proposal has been made in Japanese Patent Kokai 55-7814 and 60-152562 according to which a blend of a silicone rubber and an acrylic rubber having improved miscibility and workability in processing and vulcanizable with an organic peroxide as a vulcanizing agent can be prepared by compounding a blend of an organopolysiloxane and an acrylic rubber before vulcanization with a copolymer of an organosiloxane monomer having an aliphatically unsaturated hydrocarbon group in the molecule and an acrylic ester. The blended rubber composition of this type has a problem that the composition is liable to cause gelation when the molecular weight thereof is high because the additive is a copolymer obtained by the copolymerization of the aliphatically unsaturated groups such as vinyl in the organosiloxane monomer and the acrylic groups in the acrylic ester monomer. In addition, the additive copolymer, which is necessarily added in a considerably large amount, has no crosslinking points, such as unsaturated groups, in the molecular structure and is not covulcanizable with other polymeric constituents of the composition by using an organic peroxide as a vulcanizing agent so that, when the amount of addition thereof is large, the rubber after vulcanization may have only relatively low mechanical strengths.

It is of course an economical requirement that the above mentioned improved rubber can be obtained by modifying an acrylic rubber with a small amount of an organopolysiloxane which is more expensive than the acrylic rubber notwithstanding the fact that full improvements in the properties of an acrylic rubber can be obtained only by using a relatively large amount of an organopolysiloxane. Taking the cold resistance of the rubber as an example, flexibility of an acrylic rubber at low temperatures can be improved only when the amount of the blended organopolysiloxane is 50% by weight or larger in the blend with an acrylic rubber as is shown by the results of the TR test specified in ASTM D-1320 and Gehman torsion test specified in ASTM D-1053 which give a measure for the flexibility of a rubber at low temperatures.

On the other hand, many proposals have been made, for example, in Japanese Patent Publications 54-3512, 54-6271 and 55-15086 with an object to improve an acrylic polymer relative to the heat and cold resistance, weatherability and impact strength by a method of copolymerization of an acrylic polymer and a polymerizable organosiloxane monomer. Most of these hitherto proposed methods utilize the radical-polymerizability of the vinyl groups bonded to the silicon atoms of the organosiloxane monomer so that a copolymer having a sufficiently high degree of polymerization can hardly be obtained due to the gelation of the polymer. Therefore, the copolymer of this type cannot be used as a base constituent of a rubber composition to give a vulcanizate having excellent mechanical strengths but can be used only as a resinous polymer or as a vehicle of coating compositions or paints.

The above mentioned Japanese Patent Publication 54-6271 teaches a copolymer obtained by the copolymerization of an organosiloxane monomer having mercapto groups and an ethylenically unsaturated monomer including acrylic monomers. This copolymer, however, is not suitable as a base polymer of a rubber composition due to the poor crosslinkability and the three-dimensional structure of the organosiloxane monomer containing $RSiO_{1.5}$ units and $SiO_2$ units, R being a monovalent hydrocarbon group.

Further, U.S. Pat. No. 3,622,547, Japanese Patent Publication 49-13215 and Japanese Patent Kokai 58-222129 teach trithiol-s-triazine compounds along with elementary sulfur and metal soaps as a class of crosslinking agents for an acrylic rubber in which the crosslinking points are provided by active halogen atoms in general. Although an acrylic rubber vulcanized with a di- or trithiol-s-triazine compound can be imparted with greatly improved heat resistance, acrylic rubber compositions compounded with such a crosslinking agent are not so widely used in practice due to the poor storability thereof.

SUMMARY OF THE INVENTION

The present invention accordingly has an object to provide a novel and improved rubber composition compounded with an organopolysiloxane-modified acrylic polymer as the base ingredient, which is capable of giving a vulcanizate having excellent heat resistance as well as oil and solvent resistance to be freed from the above described various problems and disadvantages in the prior art rubber compositions.

Thus, the rubber composition of the present invention comprises, in admixture:

(a) 100 parts by weight of an organopolysiloxane-modified acrylic polymer, which is obtained by a process comprising the steps of (1) emulsifying an organopolysiloxane represented by the average unit formula

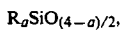

in which R is a substituted or unsubstituted monovalent hydrocarbon group, from 0.0025 to 10% by moles of the groups denoted by R in a molecule being each a monovalent hydrocarbon group substituted with a mercapto group, and the subscript a is a positive number in the range from 1.98 to 2.02, in an aqueous medium to prepare an aqueous emulsion of the organopolysiloxane, (2) adding, to the aqueous emulsion of the organopolysiloxane, an acrylic monomer and a second monomer having an active halogen atom or an epoxy group in a molecule in an amount in the range from 0.1 to 10% by moles based on the acrylic monomer, (3) adding a radical polymerization initiator to the aqueous emulsion, and (4) agitating the aqueous emulsion of the organopolysiloxane containing the acrylic monomer, the second monomer and radical polymerization initiator to effect copolymerization of the monomers;

(b) from 10 to 200 parts by weight of a reinforcing filler having a specific surface area of at least 30 m$^2$/g; and (c) from 0.1 to 10 parts by weight of a crosslinking agent.

In particular, the organopolysiloxane-modified acrylic polymer perferably contains from 10 to 90% by weight of the organopolysiloxane moiety and from 90 to 10% by weight of the moiety of the acrylic copolymer derived from the acrylic monomer and the second monomer which is preferably vinyl chloroacetate.

DETAILED DESCRIPTION OF THE PREFERRED EMBODIMENTS

As is described above, the most characteristic feature of the inventive rubber composition consists in the use of a specific organopolysiloxane-modified acrylic polymer as the base ingredient which is obtained by the above described process of emulsion copolymerization. The organopolysiloxane with which the acrylic copolymer is modified is represented by the average unit formula

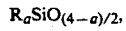

in which R is a substituted or unsubstituted monovalent hydrocarbon group, from 0.0025 to 10% by moles of the groups denoted by R in a molecule being each a monovalent hydrocarbon group substituted with a mercapto group, and the subscript a is a positive number in the range from 1.98 to 2.02.

The group denoted by the symbol R is exemplified by alkyl groups, e.g., methyl, ethyl, propyl, butyl and octyl groups, alkenyl groups, e.g., vinyl and allyl groups, aryl groups, e.g., phenyl and tolyl groups, and cycloalkyl groups, e.g., cyclohexyl group, as well as those substituted hydrocarbon groups obtained by replacing a part or all of the hydrogen atoms in the above named hydrocarbon groups with substituent atoms and/or groups such as halogen atoms, cyano groups, mercapto groups and the like, e.g., chloromethyl, 3,3,3-trifluoropropyl, 2-cyanoethyl and 3-mercaptopropyl groups. It is essential that from 0.0025 to 10% by moles of the groups denoted by R in a molecule should be mercapto-substituted monovalent hydrocarbon groups such as mercaptomethyl and 3-mercaptopropyl groups. These mercapto-substituted hydrocarbon groups serve to provide bonding points with the acrylic copolymer. When the amount of these mercapto-substituted monovalent hydrocarbon groups is too small, the workability of the polymer in the compounding works would be greatly affected and the rubber vulcanizate prepared from the composition cannot be imparted with fully improved cold resistance due to the deficiency in the bonding points between the organopolysiloxane moiety and the acrylic copolymer. When the amount of these mercapto-substituted hydrocarbon groups is too large, on the other hand, the molecular chains of the organopolysiloxane may be subject to scission due to the influence of the mercapto groups and the chain length of the acrylic copolymer is also decreased so that the rubber vulcanizate would have no sufficiently high mechanical strengths.

The subscript a in the above given average unit formula is a positive number of 1.98 to 2.02. A value of the subscript a smaller than 1.98 means that the organopolysiloxane contains a three-dimensional structure in a large content so that the rubber vulcanizate prepared from such an organopolysiloxane cannot exhibit high elongation as a rubbery material. A value of the subscript a larger than 2.02 means that the organopolysiloxane has a molecular weight so small that the rubber vulcanizate cannot be imparted with high mechanical strengths. The organopolysiloxane should preferably have a straightly linear molecular structure although branched and network-like molecular structures may be contained in a limited degree. The organopolysiloxane has an average degree of polymerization, i.e. number of silicon atoms in a molecule, in the range from 100 to 10,000 or, preferably, from 4000 to 8000. When the average degree of polymerization is too small, the rubber vulcanizate does not have high mechanical strengths as is mentioned above. When the average degree of polymerization is too large, on the other hand, some difficulties are encountered in the compounding works of the organopolysiloxane-modified acrylic copolymer with the filler. The terminal groups with which the molecular chain ends of the organopolysiloxane are blocked are not particularly limitative including trimethyl silyl, dimethyl vinyl silyl, 3-mercaptopropyl dimethyl silyl, silanolic hydroxy and alkoxy, e.g., methoxy, groups.

Prior to the emulsion polymerization of the acrylic monomers, an aqueous emulsion of the organopolysiloxane is prepared by a known method. For example, an organopolysiloxane described above is added to an aqueous medium containing a surface active agent and the mixture is vigorously agitated so that the organopolysiloxane is emulsified in the medium to form a stable emulsion. Alternatively, an aqueous emulsion of an organopolysiloxane can be prepared by emulsifying an oligomeric organopolysiloxane in an aqueous medium containing a surface active agent which is a higher alkyl-substituted phenyl sulfonic acid also to serve as a polymerization catalyst of the organopolysiloxane oligomer in an emulsified state. The content of the organopolysiloxane in the aqueous emulsion is preferably in the range from 30 to 50% by weight in respect of the stability of the emulsion and productivity.

The organopolysiloxane-modified acrylic copolymer as the principal ingredient in the inventive rubber composition is prepared by the emulsion polymerization of an acrylic monomer and a second monomer in the above described aqueous emulsion of the organopolysiloxane. Examples of the acrylic monomer include alkyl acrylates, e.g., methyl acrylate, ethyl acrylate and butyl acrylate, alkoxyalkyl or alkylthioalkyl acrylates, e.g., 2-methoxyethyl acrylate and 2-ethoxyethyl acrylate, and cyanoalkyl acrylates. The second monomer to be copolymerized with the acrylic monomer is either an active halogen-containing monomer or an epoxy group-containing monomer, of which active halogen-containing monomers are preferred in view of the vulcanizability of the rubber compound and the heat resistance of the vulcanizate thereof. The active halogen atom here implied is an atom of halogen bonded to a carbon atom which in turn is bonded to a carbon atom of a carbonyl group —CO— or to a carbon atom which is a member of a phenyl group. Examples of the active halogen-containing monomers include vinyl chloroacetate, vinyl 2-chloropropionate, allyl chloroacetate, vinyl benzyl chloride and the like as well as glycerin 1-chloroacetate-3-methacrylate of the structural formula Cl—CH$_2$—CO—O—CH$_2$—CHOH—CH$_2$—O—CO—CCH$_3$=CH$_2$ which is a reaction product of glycidyl methacrylate and chloroacetic acid. The bromine equivalents having a bromine atom in place of the chlorine atom in the above named chlorine-containing compounds are also suitable. Among the above named active halogen-containing monomers, vinyl chloroacetate is preferred. Examples of the epoxy group-containing monomer include glycidyl acrylate, glycidyl methacrylate, vinyl glycidyl ether, allyl glydicyl ether, methallyl glycidyl ether and the like, of which glycidyl methacrylate and allyl glycidyl ether are preferred. The amount of these second monomers added to the aqueous emulsion of the organopolysiloxane together with the acrylic monomer is in the range from 0.1 to 10% by moles based on the acrylic monomer. When the amount of the second monomer is too small, the crosslinking density in the vulcanizate of the rubber composition cannot be high enough after vulcanization with the vulcanizing or crosslinking agent so that the vulcanizate has poor mechanical strengths. When the amount of the second monomer is too large, on the other hand, the crosslinking density in the vulcanizate of the rubber composition is too high so that the vulcanizate after vulcanization with the vulcanizaing agent may have poor rubbery elasticity.

It is optional that, in the above described formulation of the polymerization mixture for the copolymerization, a part of the acrylic monomer is replaced with one or more of other radical-polymerizable monomers such as acrylonitrile, styrene, α-methyl styrene, acrylamide, vinyl chloride, vinylidene chloride, vinyl acetate and the like in such a limited amount that the properties of the resultant organopolysiloxane-modified acrylic polymer are not adversely influenced.

The copolymerization of the above described acrylic monomer and the second monomer in an aqueous emulsion of the organopolysiloxane is performed by using a radical polymerization initiator which may be of the water-soluble type or monomer-soluble type. Examples of the water-soluble initiator include ammonium persulfate, potassium persulfate, hydrogen peroxide, tert-butyl hydroperoxide and the like. Examples of the monomer-soluble initiator include benzoyl peroxide, lauryl peroxide, cumene hydroperoxide, cumyl peroxy neodecanoate, dibutyl peroxide, tert-hexyl peroxy pivalate, diisopropylperoxy dicarbonate, tert-butylperoxy maleic acid, azobisisobutyronitrile and the like. The copolymerization reaction can proceed even at 40° C. or below when the reaction is initiated by a catalyst of the so-called redox system which is a combination of a peroxide such as those named above and a reducing agent. The reducing agent is exemplified by sodium hydrogen-sulfite, L-ascorbic acid, sodium formaldehyde sulfoxylate, glucose, sucrose and the like as combined with a trace amount of an iron (II) salt. The iron (II) salt can be replaced with another water-soluble salt of a metal such as copper, cobalt and manganese.

The copolymerization reaction is performed usually at a temperature in the range from 0° to 80° C. It is preferable that the copolymerization is performed at 40° C. or below in respect of the blending workability of the copolymer as well as the properties of the rubber composition after vulcanization. The copolymerization can be performed even at 0° C. or below by admixing the polmerization medium with a water-soluble alcohol, ethylene glycol and the like. After completion of the copolymerization reaction, the copolymer emulsion is subjected to a salting-out treatment with addition of a metal salt such as calcium choride and the coagulum is freed from the aqueous medium by decantation and filtration followed by washing with water and drying to give the desired organopolysiloxane-modified acrylic copolymer.

The component (b) compounded with the thus obtained organopolysiloxane-modified acrylic copolymer is a reinforcing filler having a specific surface area of at least 30 m$^2$/g. Examples of suitable reinforcing fillers include inorganic and organic ones such as fumed silica fillers manufactured by a dry process and available under tradenames of Aerosil, Cab-O-Sil and the like, precipitated silica fillers manufactured from sodium silicate or ethyl silicate by a wet process, magnesium silicate, calcium silicate, carbon black and the like, optionally, surface-treated with an organosilane compound or an organopolysiloxane. The amount of the compounded reinforcing filler in the inventive composition is in the range from 10 to 200 parts by weight or, preferably, from 30 to 80 parts by weight per 100 parts by weight of the organopolysiloxane-modified acrylic copolymer as the component (a). When the amount thereof is too small, the vulcanizate prepared from the rubber composition would have poor mechanical properties due to deficiency in the reinforcing effect. When the amount thereof is too large, on the other hand, the workability in the compounding works and molding of the composition is badly affected and the vulcanizate of the composition may have very poor rubbery elasticity.

It is a known technology that the dispersibility of a reinforcing silica filler in a rubbery polymer can be improved by admixing the composition with a small amount of an organosilicon compound having affinity with the silica filler and capable of being adsorbed on and bonded to the surface of the filler particles. Examples of such a dispersion aid include so-called carbon-functional silanes such as vinyl trialkoxy silanes, 3-methacryloxypropyl trimethoxy silane, 3-mercaptopropyl trimethoxy silane and the like, α,ω-dihydroxy methyl vinyl polysiloxanes, hexamethyl disilazane and the like. The use of the above mentioned α,ω-dihydroxy methyl vinyl polysiloxanes and hexamethyl disilazane as a dispersion aid is preferable also in respect of the effect that the surface of the filler particles is imparted with hydrophobicity so that the rubber composition is prevented from foaming and freed from adverse influences on the electrical properties due to the moisture adsorbed on the filler particles.

The component (c) in the inventive rubber composition is a crosslinking agent. Various types of crosslinking agents can be used for the purpose provided that the agent can react with the active halogen atoms or epoxy groups introduced by the copolymerization of the second monomer to provide necessary crosslinking points to convert the composition into a rubbery elastomer. When the crosslinking points are provided by the active halogen atoms, a suitable crosslinking agent is a di- or trithiol-s-triazine compound. Trithiol-s-triazine is available under a tradename of Disnet F from Sankyo Kasei Co. The dithiol-s-triazine compound may be 2,4-dithiol-6-dibutylamino-s-triazine or 2,4-dithiol-6-anilino-s-triazine available under the tradenames of Disnets DB and AF, respectively, from the same company as above or 2,4-dithiol-6-dibenzylamino-s-triazine. It is optional or preferable that these triazine compounds are used in combination with a dithiocarbamic acid derivative, 2,2'-dithio bisbenzothiazole, alkali or alkaline earth metal salt of a carboxylic acid and the like. A combination of an alkali metal salt of a carboxylic acid and sulfur or a sulfur-containing organic compound is also usable satisfactorily. Good vulcanizability and stable workability of the composition can be obtained by the combined use of an N-substituted mono- or bismaleimide compound, urea compound, thiourea compound, imidazoline compound, amino acid and the like.

When the crosslinking points are provided by the epoxy groups, suitable crosslinking agents include salts of dithiocarbamic acid, ammonium salts of carboxylic acids, diamine carbamates, polyamines, combinations of phthalic anhydride and an imidazole compound, combinations of a polybasic carboxylic acid or anhydride thereof and a quaternary ammonium salt or quaternary phosphonium salt, combinations of a guanidine compound and sulfur or an organic sulfur compound and the like.

The amount of the crosslinking agent as the component (c) compounded in the inventive rubber composition is in the range from 0.1 to 10 parts by weight per 100 parts by weight of the organopolysiloxane-modified acrylic copolymer as the component (a). When the amount of the crosslinking agent is too small, the composition cannot be fully cured so that no practically useful rubbery elastomer can be obtained. When the amount thereof is too large, on the other hand, the vulcanizate of the composition may have a greatly decreased mechanical strength due to the excessively large crosslinking density.

The rubber composition of the present invention can be prepared by uniformly blending the above described components (a), (b) and (c) as the essential ingredients together with other optional additives. The type of the blending machine used therefor is not particularly limitative and any rubber processing machines used in the rubber technology can be used including two-roller mills, kneaders, pressurizing kneaders, Banbury mixers, intermixers, continuous screw blenders and the like. Examples of optional additives include antioxidants, process oils, ultraviolet absorbers, coloring agents, extenders, e.g., quartz powder and clay, flame retardants and others conventionally used in rubber compositions. The rubber composition thus prepared can be shaped by molding into a desired form by a conventional molding method such as compression molding, extrusion molding, calendering and the like.

The rubber composition of the present invention prepared in the above described manner has excellent workability in the roll milling works and stability in storage and is capable of being converted by vulcanization with heating under compression into a rubbery elastomer having excellent heat and cold resistance, weatherability and oil resistance and used advantageously as a material of sealings, O-rings, gaskets, oil-resistant hoses, insulation of electric wires and cables and the like.

In the following, the rubber composition of the invention is described in more detail by way of examples as preceded by the description of preparation of the organopolysiloxane-modified acrylic copolymers. In the description below, the term of "parts" always refers to "parts by weight". The rubber compositions prepared in the following Examples and Comparative Examples were tested for the workability in roll milling and storage stability by the test of the workability in re-milling after storage for one month at room temperature. The criteria by which the milling workability and storage stability were rated are as follows.

Milling workability

A: excellent workability in milling with the composition smoothly winding around and smoothly leaving the rollers B: the composition smoothly winding around the rollers but leaving the rollers with some difficulty due to the stickiness C: a part of the rubber composition under milling retained on both of the paired rollers due to fairly strong stickiness D: almost all volume of the rubber composition retained on both of the paired rollers due to very strong stickiness Storage stability (re-milling test)

A: milling workability unaltered

B: loose disintegration into crumbles at the initial stage of re-milling but uniform sheets obtained by continued milling for 10 minutes or longer with disappearance of the crumbliness C: no uniform sheets obtained even by continuing milling for 30 minutes without disappearance of the crumbliness of the disintegrated rubber composition Preparation of copolymers Organopolysiloxane-modified acrylic copolymers, referred to as the polymers P-1, P-2, P-3 and P-4 hereinbelow, were prepared in the following procedures.

Firstly, 1500 g of octamethyl cyclotetrasiloxane and 40.8 g of 3-mercaptopropyl methyl polysiloxane having a linear molecular structure were added to 1500 g of pure water containing 15 g of sodium lauryl sulfate and 10 g of dodecylbenzene sulfonic acid. The mixture was vigorously agitated using a homomixer to obtain a primary emulsion of the polysiloxanes which was passed twice through a homogenizer under a pressure of 3000 psi to give a stable aqueous emulsion.

The aqueous emulsion was transferred into a flask and heated at 70° C. for 12 hours followed by cooling to room temperature and standing for 24 hours. Then, the pH value of the emulsion was adjusted to 7 by using sodium carbonate and the emulsion was subjected to steam distillation to remove volatile polysiloxanes followed by adjustment of the content of the non-volatile matter or the organopolysiloxane to 33% by weight with addition of water. This aqueous emulsion, which is referred to as the emulsion E-1 hereinbelow, contained an organopolysiloxane of which the content of the 3-mercaptopropyl groups was 1.5% by moles relative to the overall amount of the monovalent organic groups bonded to the silicon atoms.

Another aqueous emulsion of an organopolysiloxane, referred to as the emulsion E-2 hereinbelow, was prepared in substantially the same manner as above excepting replacement of 1500 g of octamethyl cyclotetrasiloxane with a combination of each 750 g of octamethyl cyclotetrasiloxane and 1,3,5-trimethyl 1,3,5-tris-(3,3,3-trifluoropropyl) cyclotrisiloxane.

An aqueous polymerization medium was prepared by introducing 379 g of the emulsion E-1 prepared above containing 125 g of the organopolysiloxane together with 1200 g of pure water into a three-necked flask of 3-liter capacity equipped with a stirrer, reflux condenser, thermometer and gas-inlet tube. The polymerization medium was kept at a temperature of 10° C. under a stream of nitrogen gas and 0.40 g of tert-butyl hydroperoxide, 2.0 g of L-ascorbic acid and 0.001 g of iron (II) sulfate heptahydrate were added thereto. Thereafter, a mixture of 489.5 g of ethyl acrylate and 10.5 g of vinyl chloroacetate was added thereto dropwise under vigorous agitation over a period of 3 hours and, after completion of the addition of the monomer mixture, agitation was further continued for additional 1 hour to complete the polymerization reaction. The polymerizate emulsion was subjected to a treatment of salting-out by adding a saturated aqueous solution of calcium chloride and the coagulum was freed from the polymerization medium by filtration, washed with water and dried to give 615 g of an organopolysiloxane-modified acrylic copolymer, which is referred to as the polymer P-1 hereinbelow, having a Mooney viscosity $ML_{1+4}$ (100° C.) of 45. The polymerization yield of the polymer P-1 was 98.4% based on the total amount of the organopolysiloxane, ethyl acrylate and vinyl chloroacetate.

Polymers P-2, P-3 and P-4 were prepared each in substantially the same manner as above excepting modification of the formulation of the polymerization mixture. Thus, the polymer P-2, having a Mooney viscosity $ML_{1+4}$ (100° C.) of 40, was prepared by increasing the amount of the emulsion E-1 to 758 g corresponding to an amount of 250 g of the organopolysiloxane and decreasing the amount of ethyl acrylate to 364.5 g. The polymer P-3, having a Mooney viscosity $ML_{1+4}$ (100° C.) of 43, was prepared by replacing the emulsion E-1 with the same amount of the emulsion E-2 and replacing 489.5 g of ethyl acrylate with a combination of 239.0 g of ethyl acrylate, 125 g of n-butyl acrylate and 125 g of 2-methoxyethyl acrylate. Further, the polymer P-4, having a Mooney viscosity $ML_{1+4}$ (100° C.) of 41, was prepared in the same manner as in the preparation of the polymer P-1 excepting replacement of 489.5 g of ethyl acrylate with a combination of 342.5 g of n-butyl acrylate and 147 g of 2-methoxyethyl acrylate. The polymerization yields of the polymers P-2, P-3 and P-4 were each in the range from 98 to 99% based on the total amount of the organopolysiloxane, the acrylic monomer or monomers and vinyl chloroacetate.

For comparison, three more acrylic copolymers, referred to as the polymers P-5, P-6 and P-7 hereinbelow, having Mooney viscosities $ML_{1+4}$ (100° C.) of 47, 44 and 42, respectively, were prepared. The procedure for the copolymerization was substantially the same as in the above described preparation of the polymers P-1 to P-4 excepting omission of the aqueous emulsion of the organopolysiloxane. Thus, and aqueous polymerization medium was prepared by dissolving 3 g of sodium lauryl sulfate and 7 g of another surface active agent (Pronon 208, a product by Nippon Oil & Fat Co.), keeping the solution at 10° C. and adding 0.40 g of tert-butyl hydroperoxide, 2.0 g of L-ascorbic acid and 0.001 g of iron (II) sulfate heptahydrate thereto. A mixture of acrylic monomer or monomers and vinyl chloroacetate was added dropwise to the aqueous polymerization medium under agitation over a period of 3 hours. The kinds and amounts of the acrylic monomer or monomers and the amount of vinyl chloroacetate for the preparation of the polymers P-5, P-6 and P-7 were identical with those in the preparation of the polymers P-1, P-3 and P-4, respectively.

EXAMPLES 1 AND 2 AND COMPARATIVE EXAMPLE 1.

Three rubber compositions, referred to as the rubbers R-1, R-2 and R-3 hereinbelow, were prepared in Examples 1 and 2 and Comparative Example 1, respectively, each by uniformly blending, on a two-roller mill, 100 parts of the polymers P-1, P-2 or P-5, respectively, with 1 part of stearic acid, 2 parts of a substituted diphenylamine-based aging retarder (Naugard 445, a product by Uniroyal Co.), 50 parts of FEF carbon having a specific surface area of 50 $m^2/g$, 3 parts of sodium stearate, 0.25 part of potassium stearate and 0.3 part of sulfur. Each of the rubber compositions R-1 and R-2 had excellent workability in roll milling rated as A while the rubber composition R-3 had somewhat poor milling workability rated as B. The rubber compositions R-1, R-2 and R-3 had storage stability rated as A, A and C, respectively.

Each of the thus prepared rubber compositions was subjected to a primary vulcanization treatment at 180° C. for 8 minutes under compression of 30 $kgf/cm^2$ and then to a secondary vulcanization treatment in an oven at 150° C. for 15 hours to give a sheet having a thickness of 2 mm. The general properties of these rubber vulcanizates were measured according to the procedures specified in JIS K 6301 to give the results shown in Table 1, which also includes the data obtained in the tests of the permanent compression set, heat resistance, oil resistance and cold resistance determined in the following manner. The testing procedures were the same also for the data given in the succeeding tables. In these tables, the data of the permanent compression set were obtained after 70 hours under compression at 150° C. The heat resistance of the vulcanizates was evaluated by measuring the mechanical properties thereof after heating at 175° C. for 70 hours and the oil resistance of the vulcanizates was evaluated by measuring the increments in volume and weight of the test piece after immersion in No. 3 oil at 150° C. for 70 hours. Evaluation of the cold resistance TR-10, TR-30, TR-50 and TR-70 of the vulcanizates was performed according to the procedure specified in ASTM D-1329.

As is clear from the results shown in Table 1, the rubber composition of the present invention has excellent workability in roll milling and gives a vulcanizate having greatly improved heat and cold resistance as compared with the comparative rubber composition compounded with the acrylic rubber unmodified with the organopolysiloxane.

EXAMPLES 3 TO 8 AND COMPARATIVE EXAMPLES 2 AND 3.

Rubber compositions R-4 to R-9 in Examples 3 to 8, respectively, were prepared each by blending 100 parts of one of the polymers P-1 to P-7 as indicated in Tables 2(a) and 2(b) below with 1 part of stearic acid, 2 parts of Naugard 445 (supra) and other additives of the kinds and amounts indicated in the same tables. In the tables, Aerosil A-200 is a tradename of Nippon Aerosil Co. for a fumed silica filler and Celite is a tradename of Johns Manville Co. for diatomaceous earth used as a filler.

TABLE 1

| Rubber composition | R-1 | R-2 | R-3 |
|---|---|---|---|
| As cured | | | |
| Hardness, JIS | 61 | 60 | 63 |
| Ultimate elongation, % | 380 | 460 | 340 |
| Tensile strength, kgf/cm$^2$ | 148 | 120 | 166 |
| 100% modulus, kgf/cm$^2$ | 35 | 24 | 46 |
| Tear strength, kgf/cm | 33 | 25 | 36 |
| Permanent compression set, % | 30 | 23 | 35 |
| Heat resistance, increment in | | | |
| Hardness, JIS, points | +3 | +1 | +7 |
| Ultimate elongation, % | +7 | −1 | −10 |
| Tensile strength, % | −5 | −2 | −8 |
| Oil resistance, increment in | | | |
| Volume, % | +18 | +25 | +14 |
| Weight, % | +14 | +20 | +10 |
| Cold resistance, TR-10, °C. | −20 | −31 | −10 |

TABLE 2 (a)

| Rubber Composition | R-4 | R-5 | R-6 | R-7 |
|---|---|---|---|---|
| Polymer No. | P-1 | P-3 | P-3 | P-3 |
| Additives, parts | | | | |
| Aerosil A-200 | 50 | 50 | 20 | 50 |
| Celite | — | — | 15 | — |
| FEF carbon | — | — | 15 | — |
| Siloxane oil | 5 | 5 | 2 | 5 |
| Sulfur | — | — | — | 0.3 |
| Potassium stearate | — | — | — | 0.25 |
| Sodium stearate | — | — | — | 3 |
| Trithiol-s-triazine | 1.5 | 1.5 | 1.5 | — |
| 2,4-Dithiol-6-dibenzyl amino-s-triazine | — | — | — | — |
| Magnesium oxide | 5 | 5 | 5 | — |
| Zinc dimethyldithio-carbamate | 1.5 | 1.5 | 1.5 | — |
| Milling workability | A | A | A | A |
| Storage stability | A | A | A | A |

TABLE 2 (b)

| Rubber Composition | R-8 | R-9 | R-10 | R-11 |
|---|---|---|---|---|
| Polymer No. | P-3 | P-4 | P-6 | P-7 |
| Additives, parts | | | | |
| Aerosil A-200 | 50 | — | 50 | 50 |
| Celite | — | — | — | — |
| FEF carbon | — | — | — | — |
| Siloxane oil | 5 | — | 5 | 5 |
| Sulfur | — | — | — | — |
| Potassium stearate | — | — | — | — |
| Sodium stearate | — | — | — | — |
| Trithiol-s-triazine | — | 1.5 | 1.5 | 1.5 |
| 2,4-Dithiol-6-dibenzyl amino-s-triazine | 1.5 | — | — | — |
| Magnesium oxide | 5 | 5 | 5 | 5 |
| Zinc dimethyldithio-carbamate | 1.5 | 1.5 | 1.5 | 1.5 |
| Milling workability | A | B | C | D |
| Storage stability | B | A | C | C |

Each of the rubber compositions excepting R-7 was subjected to curing first at 165° C. for 12 minutes under compression with a pressure of 30 kgf/cm$^2$ for the primary vulcanization and then at 175° C. for 8 hours in an oven for the secondary vulcanization to give a sheet having a thickness of 2 mm. The curing schedule of the rubber composition R-7 was the same as in the vulcanization of R-1 to R-3 in the preceding examples. These vulcanizates were subjected to the tests of the mechanical properties, heat resistance, oil resistance and cold resistance in the same manner as in the preceding examples to give the results shown in Tables 3(a) and 3(b) below.

TABLE 3 (a)

| Rubber composition | R-4 | R-5 | R-6 | R-7 |
|---|---|---|---|---|
| As cured | | | | |
| Hardness, JIS | 70 | 68 | 64 | 65 |
| Ultimate elongation, % | 420 | 380 | 350 | 340 |
| Tensile strength, kgf/cm$^2$ | 152 | 130 | 124 | 126 |
| 100% modulus, kgf/cm$^2$ | 43 | 40 | 36 | 37 |
| Tear strength, kgf/cm | 38 | 35 | 31 | 30 |
| Permanent compression set, % | 33 | 32 | 30 | 31 |
| Heat resistance, increment in | | | | |
| Hardness, JIS, points | ±0 | +1 | +1 | +2 |
| Ultimate elongation, % | +2 | +4 | +3 | +6 |
| Tensile strength, kgf/cm$^2$ | −1 | −2 | ±0 | −3 |
| Oil resistance, increment in | | | | |
| Volume, % | +16 | +12 | +11 | +11 |
| Weight, % | +12 | +8 | +7 | +7 |
| Cold resistance, TR-10, °C. | −20 | −30 | −31 | −32 |

TABLE 3 (b)

| Rubber composition | R-8 | R-9 | R-10 | R-11 |
|---|---|---|---|---|
| As cured | | | | |
| Hardness, JIS | 65 | 65 | 63 | 69 |
| Ultimate elongation, % | 300 | 320 | 300 | 350 |
| Tensile strength, kgf/cm$^2$ | 148 | 121 | 131 | 130 |
| 100% modulus, kgf/cm$^2$ | 41 | 33 | 39 | 36 |
| Tear strength, kgf/cm | 35 | 28 | 35 | 32 |
| Permanent compression set, % | 31 | 21 | 32 | 26 |
| Heat resistance, increment in | | | | |
| Hardness, JIS, points | +2 | +6 | +6 | +11 |
| Ultimate elongation, % | +5 | +8 | +9 | +10 |
| Tensile strength, kgf/cm$^2$ | −1 | −7 | −12 | −8 |
| Oil resistance, increment in | | | | |
| Volume, % | +12 | +30 | +17 | +27 |
| Weight, % | +8 | +25 | +14 | +24 |
| Cold resistance, TR-10, °C. | −30 | −45 | −26 | −38 |

These results clearly show that the rubber composition of the present invention has excellent workability in roll milling and good storage stability and is capable of giving vulcanizates having greatly improved heat and cold resistance as compared with the conventional acrylic polymer-based rubber compositions. In addition, the oil resistance of the vulcanizate can be improved further by introducing a fluorine-containing group of 3,3,3-trifluoropropyl group into the organopolysiloxane.

EXAMPLES 9 TO 12 AND COMPARATIVE EXAMPLE 4.

Rubber compositions R-12 to R-15 in Examples 9 to 12, respectively, were prepared each by compounding 100 parts of the polymer P-3 with 30, 40, 50 and 60 parts, respectively, of a finely divided precipitated silica filler having a specific surface area of 230 m$^2$/g (Nipsil LP, a product by Nippon Silica Co.) and then with 1 part of stearic acid, 2 parts of Naugard 445, 5 parts of a siloxane oil, 1.5 parts of trithiol-s-triazine, 5 parts of magnesium oxide and 1.5 parts of zinc dimethyldithiocarbamate. For comparison, another rubber composition R-16 was prepared in Comparative Example 4 with the same formulation as above excepting replacement of 30 to 60 parts of Nipsil LP with 40 parts of a fine quartz powder having a specific surface area of 10 m$^2$/g (Crystalite VXS, a product by Tatsumori Co.).

Each of these rubber compositions R-12 to R-16 was cured into a vulcanized rubber sheet of 2 mm thickness first by press vulcanization at 165° C. for 12 minutes under a pressure of 100 kgf/cm$^2$ and then secondary vulcanization at 175° C. for 8 hours. These vulcanizates were subjected to the measurement of the mechanical properties according to JIS K 6301 and cold resistance TR 10, TR 30, TR 50 and TR 70 according to ASTM D-1329 to give the results shown in Table 4 below. These results show that it is essential that the silica filler has a sufficiently large specific surface area.

TABLE 4

| Rubber composition | R-12 | R-13 | R-14 | R-15 | R-16 |
|---|---|---|---|---|---|
| Mechanical properties | | | | | |
| Hardness, JIS | 60 | 67 | 76 | 86 | 50 |
| Ultimate elongation, % | 210 | 190 | 185 | 175 | 120 |
| Tensile strength, kgf/cm$^2$ | 75 | 75 | 87 | 90 | 40 |
| Cold resistance, °C. | | | | | |
| TR10 | −28.4 | −27.7 | −28.8 | −27.4 | −28.2 |
| TR30 | −24.5 | −23.8 | −23.8 | −21.3 | −24.2 |
| TR50 | −21.3 | −20.6 | −19.9 | −16.8 | −21.1 |
| TR70 | −18.3 | −15.8 | −13.7 | −8.2 | −18.1 |

What is claimed is:

1. A rubber composition which comprises, in admixture:
   (a) 100 parts by weight of an organopolysiloxane-modified acrylic copolymer, which is obtained by a process comprising the steps of
      (1) emulsifying an organopolysiloxane represented by the average unit formula $$R_a SiO_{(4-a)/2}$$

in which R is a substituted or unsubstituted monovalent hydrocarbon group, from 0.0025 to 10% by moles of the groups denoted by R in a molecule being each a monovalent hydrocarbon group substituted with a mercapto group, and the subscript a is a positive number in the range from 1.98 to 2.02, in an aqueous medium to prepare an aqueous emulsion of the organopolysiloxane,
      (2) adding, to the aqueous emulsion of the organopolysiloxane, an acrylic monomer and 0.1 to 10 mole %, based on the acrylic monomer, of a second monomer having an active halogen atom or an epoxy group in a molecule and copolymerizable with the acrylic monomer,
      (3) adding a radical polymerization initiator to the aqueous emulsion, and
      (4) agitating the aqueous emulsion of the organopolysiloxane containing the acrylic monomer, second monomer and radical polymerization initiator to effect copolymerization of the monomers;
   (b) from 10 to 200 parts by weight of a reinforcing filler having a specific surface area of at least 30 m$^2$/g; and
   (c-1) from 0.1 to 10 parts by weight of a crosslinking agent selected from the group consisting of 2,4-dithiol-6-dibutylamino-s-triazine, 2,4-dithiol-6-anilino-s-triazine, 2,4-dithiol-6-dibenzylamino-s-triazine, trithiol-s-triazine, combinations of a triazine compound and a dithiocarbamic acid compound, combinations of a triazine compound and 2,2'-dithiobisbenzothiazole, combinations of a triazine compound and an alkali metal or alkaline earth metal salt of a carboxylic acid and combinations of an alkali metal salt of a carboxylic acid and sulfur or a sulfur-containing organic compound, when crosslinking points are provided by active halogen atoms, or
   (c-2) from 0.1 to 10 parts by weight of a crosslinking agent selected from the group consisting of salts of dithiocarbamic acid, ammonium salts of carboxylic acids, diamine carbamates, polyamines, combinations of phthalic anhydride and an imidazole compound, combinations of a polybasic carboxylic acid or anhydride thereof and a quaternary ammonium salt or a quaternary phosphonium salt, combinations of a guanidine compound and sulfur or a sulfur-containing organic compound, when crosslinking points are provided by epoxy groups.

2. The rubber composition as claimed in claim 1 wherein the organopolysiloxane-modified acrylic polymer contains from 10 to 90% by weight of the organopolysiloxane moiety.

3. The rubber composition as claimed in claim 1 wherein the second monomer copolymerizable with the acrylic monomer is a monomer having an active halogen atom.

4. The rubber composition as claimed in claim 3 wherein the second monomer copolymerizable with the acrylic monomer and having an active halogen atom is vinyl chloroacetate.

5. The rubber composition as claimed in claim 1 wherein the reinforcing filler as the component (b) is a finely divided silica filler.

* * * * *